April 19, 1927.
J. M. RAY
1,625,390
CORN PLANTER
Filed April 2, 1925
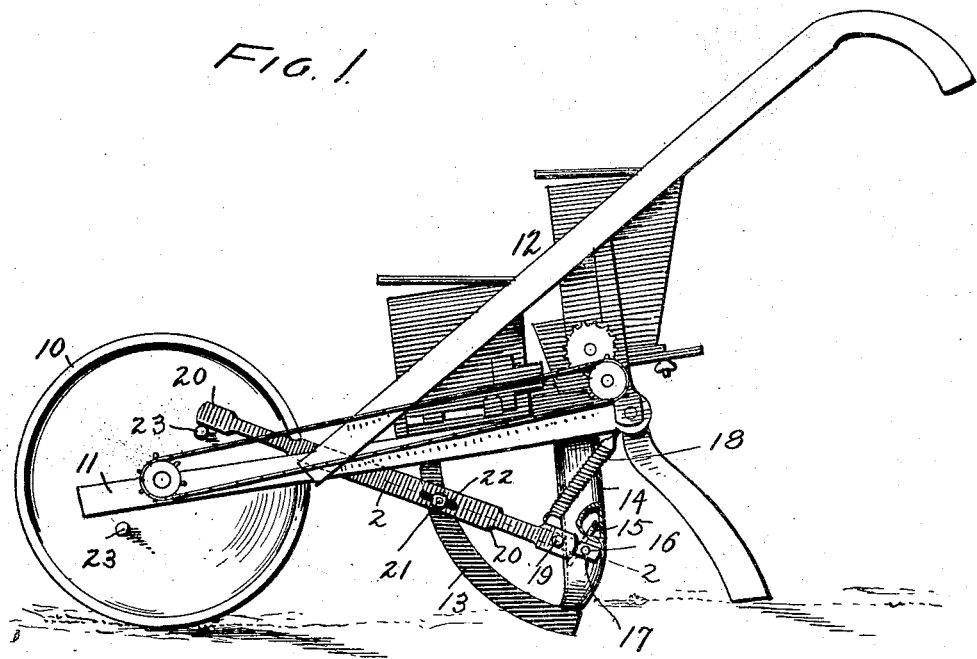
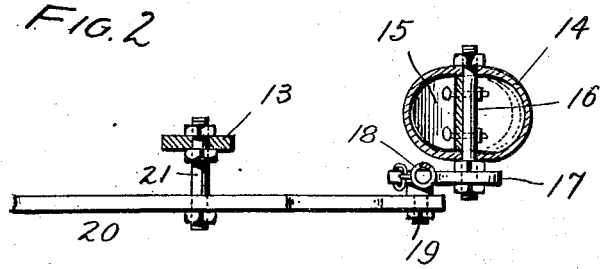
Inventor
John M. Ray
By Chas. J. Williamson
Attorney Patented Apr. 19, 1927.

1,625,390

UNITED STATES PATENT OFFICE.

JOHN M. RAY, OF APOLLO, PENNSYLVANIA.

CORN PLANTER.

Application filed April 2, 1925. Serial No. 20,107.

As a farmer, I know that there has been a great need for many years by the small farmer for an inexpensive and yet thoroughly practical attachment for a one-horse corn planter to plant the corn in hills along with the phosphate or other fertilizer, and by my invention I supply such an attachment. My invention consists in whatever is described by or is included in the terms of the appended claim.

In the annexed drawings:

Fig. 1 is a side elevation of a well known corn planter, with my invention embodied therein;

Fig. 2 is a section on the line 2—2 of Fig. 1.

The corn planter shown in the drawings is of a well known construction that comprises a front wheel, 10, mounted between parallel horizontal bars or beams, 11, (one beam shown), corn and phosphate hoppers, 12, a furrow opener or shoe, 13, and a spout, 14, into which at the top the corn and fertilizer are delivered automatically by devices not necessary to be described that are operated by sprocket gearing that connects the same with the wheel, 10.

In the lower part of the spout, 14, I place a gate or valve, 15, which is periodically rocked to open and close the spout and which in its closed position extends obliquely downward so that when it rocks to an open vertical position, corn and fertilizer thereon will readily and quickly slide by gravity off the same and down through the spout. The gate, 15, is secured to a bolt, 16, that passes horizontally through the spout and outside the latter, at one end has attached to it a crank-arm, 17, which by a coil spring, 18, fastened at one end to the arm and at the other end to the planter frame, is yieldingly held to place the gate in closed position. Pivotally connected to the crank-arm, 17, by a bolt, 19, is a lever, 20, which extends forward and upward alongside the shoe, 12, to which it is pivotally secured by a bolt, 21, that passes through a slot, 22, in the lever and which is secured by nuts on the bolt so that it may freely rock vertically under the pull of the spring, 18, in one direction and by the engagement of its front end by one or more pins, 23, secured to the wheel, 10, and by which the lever is rocked against the pull of the spring to open the gate, the gate quickly automatically closing when the pin passes out of contact with the front end of the lever. Any number of pins, 23, may be provided according to the distance apart of the hills that is desired.

It will be seen that the application of my invention to a corn planter involves no alteration of the planter construction and requires merely drilling or boring the desired number of pin holes in the wheel, 10, and possibly the substitution of a larger spout and provided with holes for the gate-pivoting bolt, and the drilling of the necessary hole in the shoe, 13, for the lever pivot, 21.

A planter equipped with my invention will regularly deposit the corn and fertilizer at the desired intervals apart, the parts are of simple and rugged construction, so that their original cost and cost of application to the planter need not be great, and they will not get out of order and the application thereof to the planter may easily be done.

Of course I do not restrict my invention to any particular construction of planter, and regard myself as entitled to the application of my invention to any construction of planter with which it may be used and to the original construction of the planter with my invention.

What I claim is:

A planter comprising a front wheel, a spout in rear of such wheel, a shoe situated between the wheel and the spout, a gate pivoted within the spout below the top thereof, a crank arm connected with the gate, a lever connected at its rear end with the crank arm and pivoted between its ends to the shoe, said lever reaching forward from its pivot alongside the wheel, means carried by the wheel to move said lever in one direction, and a spring connected with the crank arm acting to move the lever in the opposite direction.

In testimony whereof I hereunto affix my signature.

JOHN M. RAY.